US009789518B2

(12) United States Patent
Iino

(10) Patent No.: US 9,789,518 B2
(45) Date of Patent: Oct. 17, 2017

(54) FRUITS SORTING APPARATUS AND FRUITS SORTING METHOD

(71) Applicant: Nireco Corporation, Hachioji (JP)

(72) Inventor: Nobusuke Iino, Tokyo (JP)

(73) Assignee: Nireco Corporation, Hachioji (JP)

( * ) Notice: Subject to any disclaimer, the term of this patent is extended or adjusted under 35 U.S.C. 154(b) by 0 days.

(21) Appl. No.: 15/140,851

(22) Filed: Apr. 28, 2016

(65) Prior Publication Data

US 2016/0346811 A1    Dec. 1, 2016

(30) Foreign Application Priority Data

May 27, 2015   (JP) ................................. 2015-107467

(51) Int. Cl.
| | |
|---|---|
| *B07C 5/00* | (2006.01) |
| *B07C 5/342* | (2006.01) |
| *B25J 9/16* | (2006.01) |
| *B07C 5/36* | (2006.01) |

(52) U.S. Cl.
CPC ........... *B07C 5/3422* (2013.01); *B25J 9/1697* (2013.01); *B07C 5/362* (2013.01); *B07C 2501/009* (2013.01); *G05B 2219/39106* (2013.01); *G05B 2219/45105* (2013.01)

(58) Field of Classification Search
CPC ....... B07C 5/342; B07C 5/3422; B07C 5/362; B07C 2501/009
USPC ......................................... 209/938, 552, 701
See application file for complete search history.

(56) References Cited

U.S. PATENT DOCUMENTS

| | | | | |
|---|---|---|---|---|
| 4,843,561 | A * | 6/1989 | Larson .................... | A01D 46/24 209/587 |
| 5,181,596 | A * | 1/1993 | Warkentin ................ | B07C 5/36 198/370.05 |
| 5,862,919 | A * | 1/1999 | Eason ....................... | B07C 5/00 209/577 |
| 6,271,520 | B1 * | 8/2001 | Tao .......................... | B07C 5/342 250/330 |
| 6,610,953 | B1 * | 8/2003 | Tao .......................... | B07C 5/342 209/11 |
| 7,146,048 | B2 * | 12/2006 | Kupeev ................. | G06K 9/4638 382/203 |
| 7,173,708 | B2 * | 2/2007 | Ibarra .................... | B07C 5/3422 209/587 |
| 7,370,456 | B2 * | 5/2008 | Ichikawa .................. | B65B 5/06 53/155 |
| 8,469,261 | B2 * | 6/2013 | Bonner .................... | G06K 9/00 235/375 |
| 8,918,200 | B2 * | 12/2014 | Dekar .................... | B25J 11/008 700/213 |
| 9,637,310 | B1 * | 5/2017 | Zou ........................ | B65G 1/137 |

(Continued)

*Primary Examiner* — Terrell Matthews
(74) *Attorney, Agent, or Firm* — Locke Lord LLP

(57) ABSTRACT

A fruits sorting apparatus includes: a conveyance device configured to convey a plurality of charged fruits from a detection area located on an upstream side to a sorting area disposed on a downstream side; an imaging device configured to photograph the fruits in the detection area of the conveyance device; a processor configured to detect a rotten fruit and a nonstandard fruit having an irregular shape or size based on images of the fruits and vegetables imaged by the imaging device; and a robot configured to pick up the rotten fruit and the nonstandard fruit detected by the processor in the sorting area.

12 Claims, 6 Drawing Sheets

(56) References Cited

U.S. PATENT DOCUMENTS

2008/0154751 A1* 6/2008 Miles .................... G06Q 10/06
705/28
2016/0144408 A1* 5/2016 Struijk .................... B07C 5/38
209/580

* cited by examiner

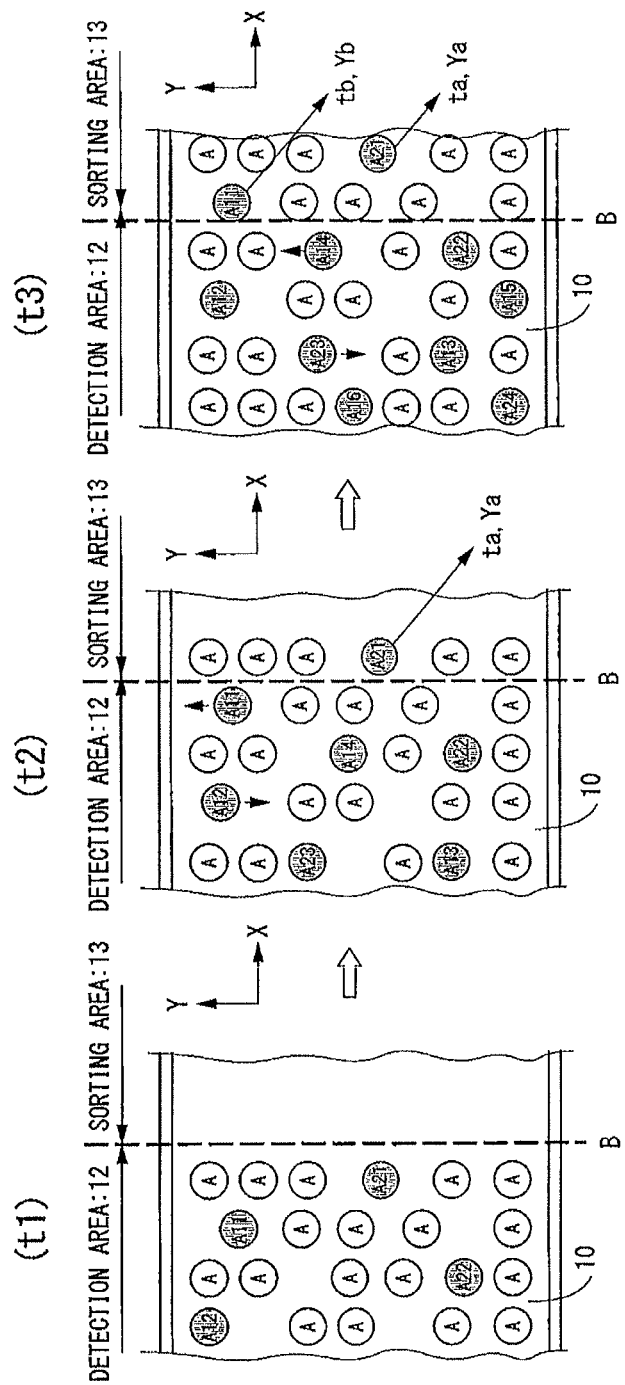

FRUITS SORTING APPARATUS AND FRUITS SORTING METHOD

BACKGROUND

Technical Field

The present invention relates to an apparatus and a method for sorting and removing fruits in a case where the collected fruits such as mandarin oranges are rotten or nonstandard.

Related Art

When collected fruits such as mandarin oranges arrive at a fruit sorting place, the fruits flow to a fruit sorting apparatus configured by a conveyance device. In an upstream process, the fruit sorting apparatus sorts and removes rotten fruits and nonstandard fruits having nonstandard sizes or shapes so as not to allow them to flow to a downstream process. Usually, such a sorting operation is manually performed by about four to eight workers through visual observation.

However, such a sorting process is performed by individual workers determining the degree of a rotten state or the degree of a nonstandard shape or size of each of fruits. Accordingly, non-uniformity of the accuracy can easily occur. In addition, it takes too long for the sorting process, and there are also cases where rotten fruits and nonstandard fruits that have been overlooked from the sorting process are transferred to the downstream process.

In addition, the population engaging in the agricultural industry decreases year by year, and most of the workers are aging. Currently, while there is a problem of labor shortage, a further challenging situation is expected in the years to come.

The present invention has been made in view of the circumstances described above, and an object thereof is to automate the process of sorting rotten fruits and nonstandard fruits and to improve the sorting accuracy, the sorting efficiency, and the stability of the sorting operation.

SUMMARY

In order to achieve the above object, according to a first aspect of the present invention, there is provided a fruits sorting apparatus including: a conveyance device configured to convey a plurality of charged fruits from a detection area located on an upstream side to a sorting area located on a downstream side; an imaging device configured to photograph the fruits in the detection area of the conveyance device; a processor configured to detect a rotten fruit and a nonstandard fruit having an irregular shape or size based on images of the fruits photographed by the imaging device; and a robot controller configured to control a robot that picks up the rotten fruit and the nonstandard fruit detected by the processor in the sorting area.

According to the first aspect of the present invention, the conveyance device conveys the fruits while rotating the fruits in the detection area and conveys the fruits in a stopped state in the sorting area.

According to the first aspect of the present invention, the processor acquires images of a plurality of faces photographed by the imaging device in the detection area for each of the fruits and detects the each of the fruits as the rotten fruit when the size of a rotten portion of the each of the fruits exceeds a decay threshold based on the plurality of the images.

According to the first aspect of the present invention, the processor acquires images of a plurality of faces photographed by the imaging device in the detection area for each of the fruits and detects the each of the fruits as the nonstandard fruit when the shape and the size of the each of the fruits deviate from ranges of standard thresholds based on the plurality of the images.

According to the first aspect of the present invention, the processor assigns an identification symbol to each of the fruits conveyed in the detection area and tracks movement of the each of the fruits, and, when the rotten fruit or the nonstandard fruit is conveyed from the detection area to the sorting area, sends out the identification symbol of the rotten fruit or the nonstandard fruit, data of timing of charging into the sorting area, and data of a position in a horizontal direction perpendicular to a conveyance direction of the conveyance device to the robot controller.

According to the first aspect of the present invention, the robot controller issues a pickup instruction for picking up the rotten fruit or the nonstandard fruit to the robot based on the identification symbol, the data of the timing, and the data of the position sent out from the processor.

According to the first aspect of the present invention, the fruit sorting apparatus further includes: a fruits disposal box for rotten fruits, into which the rotten fruit picked up by the robot is discarded; and a fruits disposal box for nonstandard fruits, into which the nonstandard fruit picked up by the robot is discarded.

According to the first aspect of the present invention, each of the fruits disposal box for rotten fruits and the fruits disposal box for nonstandard fruits is arranged on a right outer side and a left outer side of the sorting area of the conveyance device in the conveyance direction, and the robot controller controls the robot such that the rotten fruit is discarded into the fruits disposal box for rotten fruits arranged on the right outer side or the left outer side in accordance with the data of the position of the rotten fruit when the robot picks up the rotten fruit, and the nonstandard fruit is discarded into the fruits disposal box for nonstandard fruits arranged on the right outer side or the left outer side in accordance with the data of the position of the nonstandard fruit when the robot picks up the nonstandard fruit.

According to a second aspect of the present invention, there is provided a fruit sorting method including: photographing a plurality of charged fruits in a detection area located in the middle of conveyance executed by a conveyance device by using an imaging device; detecting a rotten fruit and a nonstandard fruit having an irregular shape or size based on images acquired by the imaging device; and picking up the rotten fruit and the nonstandard fruit detected in a sorting area located on a downstream side of the detection area by using a robot.

According to the second aspect of the present invention, the fruits are conveyed while being rotated in the detection area, and the fruits are conveyed in a stopped state in the sorting area.

According to the second aspect of the present invention, each of the fruits is detected as the rotten fruit when the size of a rotten portion of the each of the fruits exceeds a decay threshold.

According to the second aspect of the present invention, each of the fruits is detected as the nonstandard fruit when the shape and the size of the each of the fruits deviate from ranges of standard thresholds.

According to the second aspect of the present invention, the fruits sorting method further includes assigning an identification symbol to each of the fruits conveyed in the detection area, tracking movement of the each of the fruits, and, when the rotten fruit or the nonstandard fruit is conveyed from the detection area to the sorting area, acquiring the identification symbol of the rotten fruit or the nonstandard fruit, data of timing of charging into the sorting area, and data of a position in a horizontal direction perpendicular to a conveyance direction of the conveyance device.

According to the second aspect of the present invention, the rotten fruit or the nonstandard fruit is picked up in the sorting area by the robot based on the identification symbol, the data of the timing, and the data of the position that are acquired.

According to the second aspect of the present invention, the fruits sorting method further includes discarding the rotten fruit picked up by the robot into a fruits disposal box for rotten fruits and throwing the nonstandard fruit picked up by the robot into a fruit disposal box for nonstandard fruits.

According to the second aspect of the present invention, the rotten fruit picked up by the robot is discarded into the fruits disposal box for rotten fruits arranged on the right outer side or the left outer side in accordance with the data of the position, and the nonstandard fruit picked up by the robot is discarded into the fruit disposal box for nonstandard fruits arranged on the right outer side or the left outer side in accordance with the data of the position.

According to the present invention, by only charging collected fruits, rotten fruits and nonstandard fruits among the fruits can be automatically sorted and removed. For this reason, the shortage of labor engaging in the agricultural industry can be solved, and the instability of the sorting operation according to the labor shortage, the capability, and the physical strength can be solved. In addition, a sorting process of high accuracy can be performed through automation. Furthermore, the sorting operation can be performed at night that is a time slot in which the operation is not currently performed, and the efficiency of the sorting operation can be increased.

BRIEF DESCRIPTION OF DRAWINGS

FIG. 7 is an explanatory diagram illustrating a sorting operation executed by a fruit sorting apparatus according to an embodiment of the present invention.

DETAILED DESCRIPTION

Figure 1:
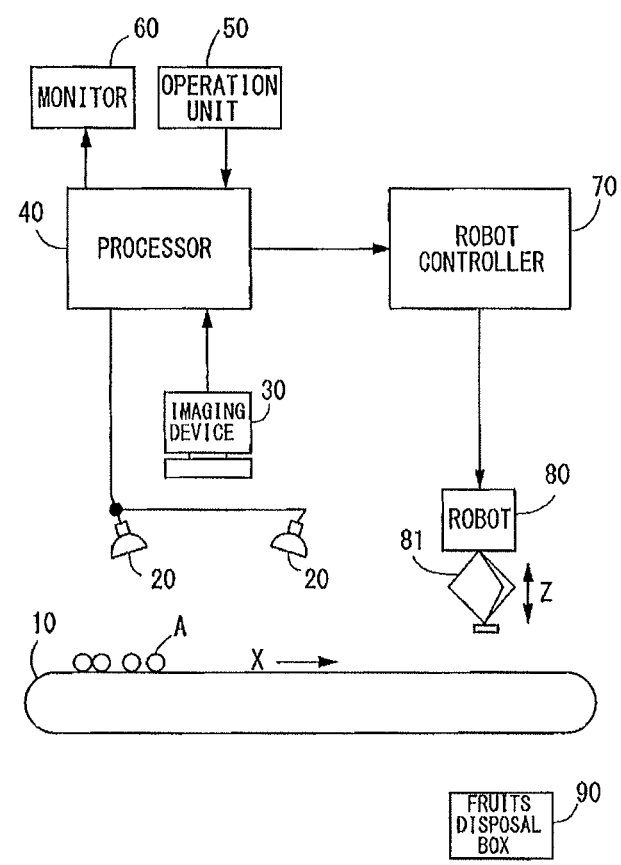
FIG. 1 is an entire configuration diagram of a fruits sorting apparatus according to an embodiment of the present invention.

Hereinafter, a fruit sorting apparatus according to an embodiment of the present invention will be described. FIG. 1 illustrates the entire configuration of the fruits sorting apparatus according to this embodiment. In FIG. 1, a conveyance device 10 is a conveyer which conveys fruits A in a direction of arrow X, a lighting device 20 includes an LED or a halogen lamp which lights the fruits A conveyed by the conveyance device 10, and an imaging device 30 uses a CCD camera which continuously photographs the fruits A lighted by the lighting device 20 in the middle of the conveyance process.

In addition, a processor 40 includes a computer including a CPU and takes in an image captured by the imaging device 30 and performs image processing thereon, detects each of the fruits A and assigns an identification symbol thereto, tracks the movement thereof, and detects rotten fruits and nonstandard fruits present among the fruits A. Then, the processor 40 outputs identification symbols, Y coordinates in a direction perpendicular to the conveyance direction denoted by arrow X, send-out timings, and the like for rotten fruits and nonstandard fruits when the rotten fruits and the nonstandard fruits are sent out from a detection area to be described later to a sorting area.

In addition, an operation unit 50 used for operating the entire fruits sorting apparatus and a monitor 60 used for displaying a manipulation content or an operation content are illustrated.

A robot controller 70 takes in the identification symbols, the Y coordinates, the send-out timings, and the like for the rotten fruits and the nonstandard fruits that have been assigned by the processor 40, and controls a robot 80 having a catcher 81.

The catcher 81 of the robot 80 moves in the conveyance direction of the conveyance device 10 that is denoted by arrow X, in the Y direction that is perpendicular to arrow X, and in the vertical direction denoted by arrow Z to pick up rotten fruits and nonstandard fruits.

Rotten fruits and nonstandard fruits picked up by the catcher 81 are discarded into a fruit disposal box 90.

Figure 2:
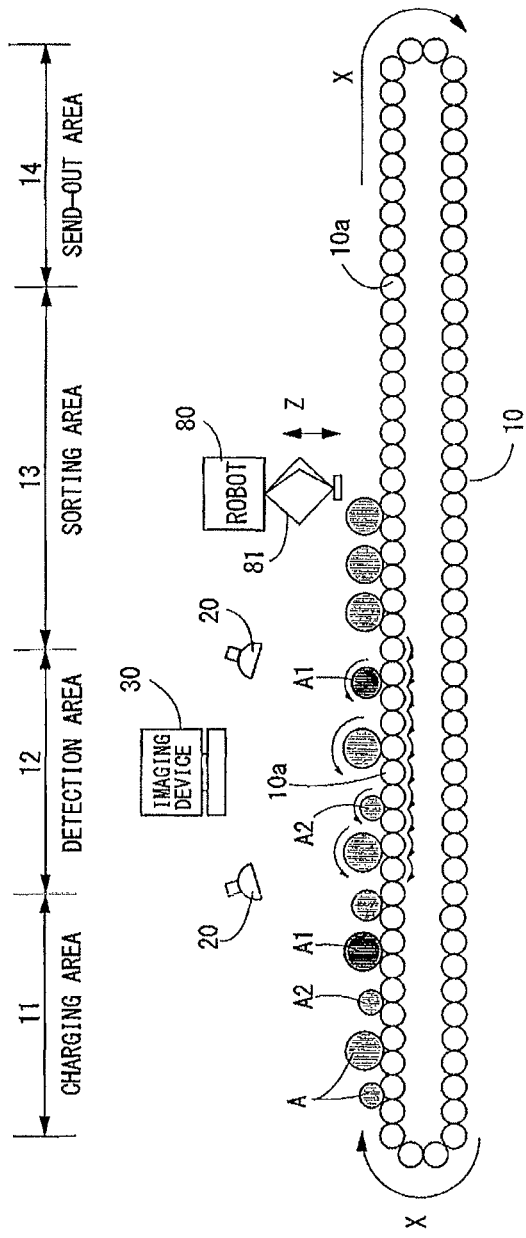
FIG. 2 is a side view of a main portion of a fruits sorting apparatus according to an embodiment of the present invention.
Figure 3:
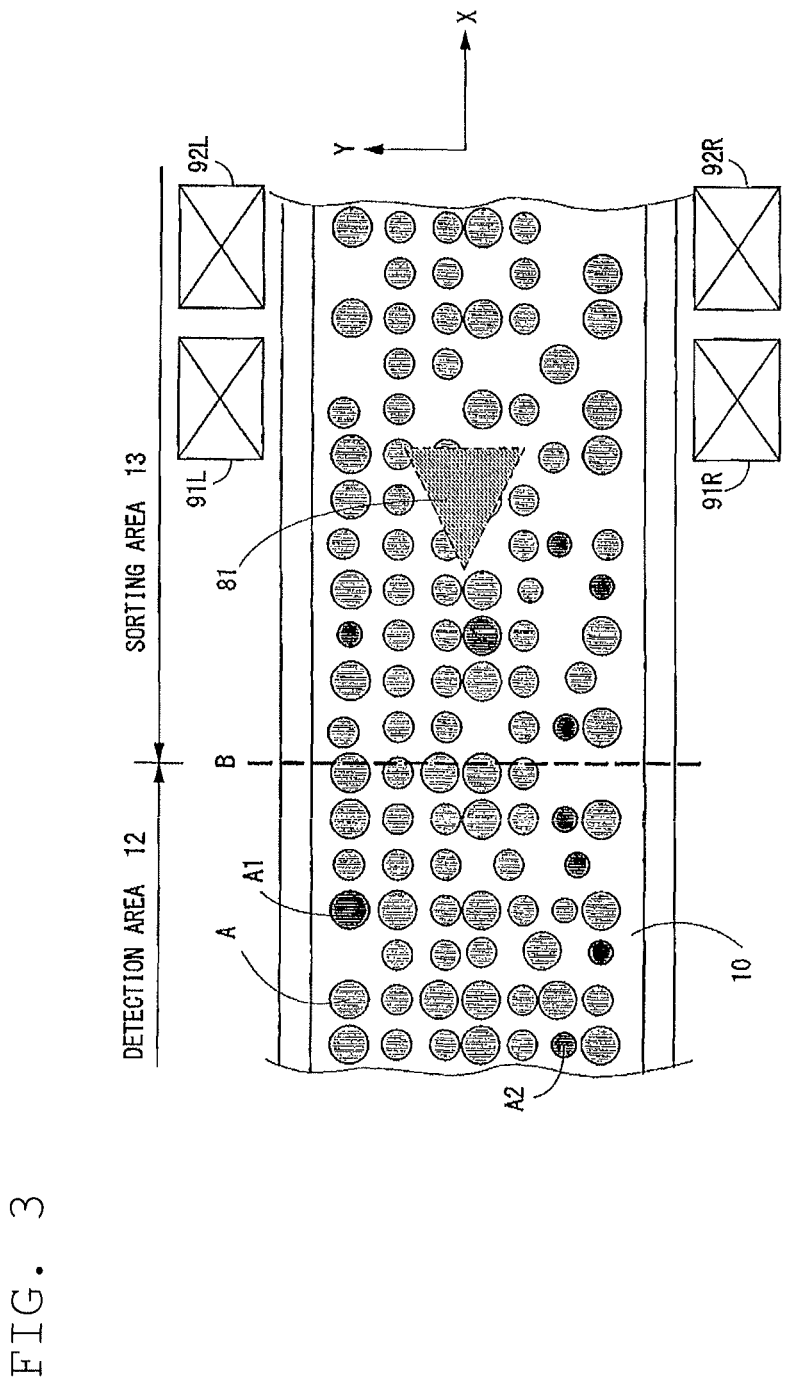
FIG. 3 is a plan view of a main portion of a fruits sorting apparatus according to an embodiment of the present invention.

FIG. 2 is a side elevation of the conveyance device 10, and FIG. 3 is a partial plan view thereof. The conveyance device 10 is configured to be endless by aligning a plurality of rotary rollers 10a in the conveyance direction denoted by arrow X, the entire circumference of said rotary rollers being painted in a predetermined color. This conveyance device 10 sequentially conveys fruits A charged into a charging area 11 along a direction of an arrow X to a detection area 12 located on a downstream thereof, a sorting area 13 located on a further downstream thereof, and a send-out area 14 located on a still further downstream thereof. On the left outer side of the sorting area 13 in the conveyance direction denoted by arrow X, fruit disposal boxes 91L and 92L are arranged, and, on the right outer side thereof, fruits disposal boxes 91R and 92R are arranged. The fruits disposal boxes 91L and 91R are used for rotten fruits, and the fruits disposal boxes 92L and 92R are used for nonstandard fruits.

While the rotary rollers 10a configuring the conveyance device 10 only move (revolution) in a direction of an arrow X without rotating (autorotation) in the charging area 11, the sorting area 13, and the send-out area 14, the rotary rollers move (revolution) in a direction of an arrow X and rotates (autorotation) in the detection area 12.

Figure 4:
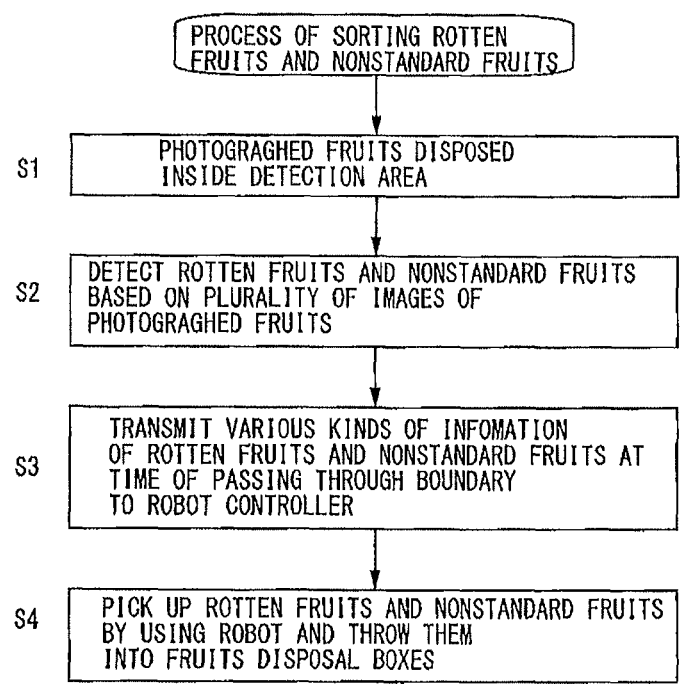
FIG. 4 is a flowchart illustrating the entire sorting process executed by a fruits sorting apparatus according to an embodiment of the present invention.

FIG. 4 is a flowchart of a sorting operation for fruits and vegetables. Fruits and vegetables A charged into the charging area 11 are conveyed in the X direction according to the movement (revolution) of the rotary roller 10a and rotate according to the rotation (autorotation) thereof in the detection area 12 of the conveyance device 10.

At this time, the external shape of each of the fruits A is not a perfect sphere and thus, moves in the X direction according to the movement and rotation of the rotary rollers 10a and moves in a Y direction (horizontal direction)

perpendicular to the X direction or forward diagonally, rearward diagonally, or due rearward. For this reason, a plurality of faces of each of the fruits A are photographed in the detection area 12.

As described above, the rotary rollers 10a of the conveyance device 10 are painted in a predetermined color, and, by setting said color to a color different from the color of the fruits, for example, setting the color of the rotary rollers to an opposite color of fruits A or setting the density of the color to a different density, the fruits disposed on the conveyance device 10 can be easily identified. Accordingly, the processor 40 identifies and detects each of the fruits A in an image captured by the imaging device 30 and assigns an identification symbol to each of the fruits A.

Each of the fruits and vegetables A that have been detected is automatically tracked, and the images of each of the fruits A are updated at a period of ¼ of the rotation speed of the fruit A or higher, while the period also depends on the processing speed of the processor 40. Then, for each of the fruits A that have been detected, the processor 40 detects whether the fruits A is a rotten fruit A1 or a nonstandard fruit A2 based on the updated images thereof (S2).

Then, when the rotten fruits A1, the nonstandard fruits A2, and the other fruits A move from the detection area 12 to the sorting area 13 over a boundary B, the automatic tracking ends.

In the sorting area 13 where the rotary rollers 10a stop to rotate, the rotten fruits A1, the nonstandard fruits A2, and the other fruits A are conveyed in a direction of an arrow X with the coordinate of a direction of an arrow Y at a time point after the boundary B being fixed.

Immediately after (after no influence of the rotation of the rotary rollers 10a is received) crossing the boundary B, information of the identification symbol of the rotten fruit A1 or the nonstandard fruit A2, the timing at the time of crossing the boundary B, the Y coordinate, and the like for each of the rotten fruits A1 and the nonstandard fruits A2 is transmitted from the processor 40 to the robot controller 70 (S3).

In the sorting area 13, the current coordinates of each of rotten fruits A1 and nonstandard fruits A2 in the middle of the conveyance process executed by the conveyance device 10 are acquired by the robot controller 70.

In other words, for rotten fruits A1 and nonstandard fruits A2, the X coordinate of each of the rotten fruits A1 and the nonstandard fruits A2 at the current time point is acquired based on an elapsed time from the timing at the time of crossing the boundary B to the current time point and the conveyance speed of the conveyance device 10 by the robot controller 70. In addition, the Y coordinate (not changing) is acquired as well.

Thus, according to an instruction of the current coordinates output from the robot controller 70, the robot 80 picks up such rotten fruits A1 or nonstandard fruits A2 by using the catcher 81 and discards them into the fruit disposal boxes 91L, 91R, 92L, and 92R (S4).

Here, rotten fruits A1 and nonstandard fruits A2 are caught by using the catcher 81 preferably in the order of earliest to latest timing of the time point of crossing the boundary B among the rotten fruits A1 and the nonstandard fruits A2. However, in a case where the processing capability of the catcher 81 is high, the catching process may be executed in an arbitrary order.

At this time, in a case where the Y coordinate of a caught rotten fruit A1 is closer to the fruit disposal box 91R than to the fruit disposal box 91L, the rotten fruit A1 is discarded into the fruit disposal box 91R. Otherwise, the rotten fruit A1 is caught into the fruit disposal box 91L.

On the other hand, in a case where the Y coordinate of a caught nonstandard fruit A2 is closer to the fruit disposals box 92R than to the fruits disposal box 92L, the nonstandard fruit A2 is discarded into the fruits disposal box 92R. Otherwise, the nonstandard fruit A2 is discarded into the fruits disposal box 92L.

In this way, by discarding a rotten fruit A1 or a nonstandard fruit A2 into a closer fruits disposal box in accordance with the Y coordinate assigned to the rotten fruit A1 or the nonstandard fruit A2, the efficiency of the sorting process can be increased.

Figure 5:
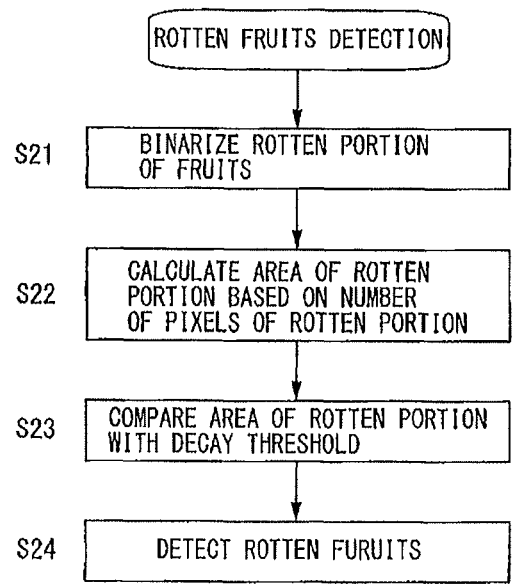
FIG. 5 is a flowchart illustrating a rotten fruit detection process executed by a fruits sorting apparatus according to an embodiment of the present invention.

FIG. 5 is a flowchart illustrating step S2 represented in FIG. 4 in detail and illustrates the process of determining whether or not a fruit A is a rotten fruit A1. In this process, each updated image of the fruit/vegetable A is binarized such that a rotten portion occurring therein is set to "1", and a normal portion is set to "0" (S21). Since the color of a rotten portion of a citrus fruit such as a mandarin orange is different from that of a normal portion in the image processing, the rotten portion can be identified. Then, the area of the rotten portion is calculated based on the number of pixels of the area of "1" (S22), and the area is compared with a decay threshold set in advance (S23). When the rotten portion is larger than the decay threshold, the fruit A is detected as a rotten fruit A1 (S24).

Figure 6:
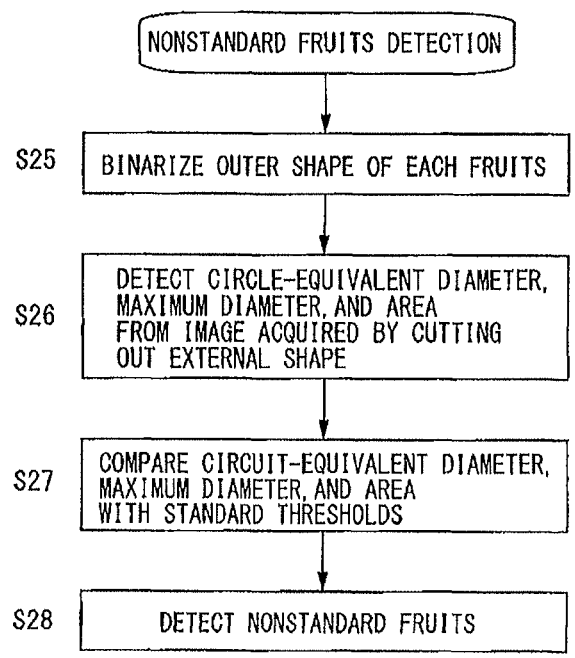
FIG. 6 is a flowchart illustrating a nonstandard fruit detection process executed by a fruit sorting apparatus according to an embodiment of the present invention.

FIG. 6 is a flowchart illustrating step S2 represented in FIG. 4 in detail and illustrates the process of determining whether or not a fruit A is a nonstandard fruit A2. In this process, each updated image of the fruit A is binarized such that the outer shape is set to "1", and the periphery thereof is set to "0" (S25). Then, based on the pixels of an image acquired by cutting out the outer shape, a circle-equivalent diameter (a diameter converted into a circle), a maximum diameter, and an area are calculated (S26), and the calculated values are compared with standard thresholds set in advance (S27). When the calculated values deviate from the ranges of the standard thresholds, the fruit A is detected as a nonstandard fruit A2 (S28).

The process of detecting a rotten fruit A1 illustrated in FIG. 5 and the process of detecting a nonstandard fruit A2 illustrated in FIG. 6 as above are sequentially executed for the individual fruit A.

Here, an operation of detecting a rotten fruit A1 and a nonstandard fruit A2 among a plurality of fruits A conveyed in the middle of the detection area 12 of the conveyance device 10 will be described with reference to FIG. 7.

At time t1, during the conveyance process executed by the conveyance device 10 in the detection area 12, rotten fruits A1 (rotten fruits A11 and A12) having the identification symbols A11 and A12 among a plurality of fruits A are detected and automatically tracked by the processor 40. In addition, nonstandard fruits A2 (nonstandard fruits A21 and A22) of which the identification symbols are A21 and A22 are detected and automatically tracked. Furthermore, although the other fruits A have identification symbols assigned thereto and are automatically tracked, the identification symbols are not illustrated for simplicity.

Thereafter, as the conveyance process executed by the conveyance device 10 is continued, at time t2, the nonstandard fruit A21 crosses the boundary B to enter the sorting area 13 from the detection area 12. When the nonstandard fruit A21 crosses the boundary B, data of the identification symbol A21 of the nonstandard fruit A21, the timing to of a time point of the passage, and the Y-direction coordinate ya at the Lime point of the passage is transmitted from the processor 40 to the robot controller 70. At this time, the rotten fruit A12 is displaced to the lower side, and the rotten fruit A11 is displaced to the upper side.

In addition, at this time t2, in the detection area 12, rotten fruits A1 (rotten fruits A13 and A14) having the identification symbols A13 and A14 are newly detected. Furthermore, a nonstandard fruit A2 (a nonstandard fruit A23) having the identification symbol A23 is detected.

Furthermore, as the conveyance process executed by the conveyance device 10 is continued, at time t3, the rotten fruit A11 crosses the boundary B and enters the sorting area 13. When the rotten fruit A11 crosses the boundary B, data of the identification symbol A11 of the rotten fruit A11, timing tb of a time point of the passage, and the Y-direction coordinate yb at the time point of the passage is transmitted from the processor 40 to the robot controller 70. At this time, the rotten fruit A14 is displaced to the upper side, and the nonstandard fruit A23 is displaced to the lower side.

In addition, at this time t3, in the detection area 12, rotten fruits A1 (rotten fruits A15 and A16) having the identification symbols A15 and A16 are newly detected, and a nonstandard fruit (a nonstandard fruit A24) having the identification symbol A24 is detected.

In the sorting area 13, the nonstandard fruit A21 is managed by the robot controller 70 based on the identification symbol A21, the timing ta, and the coordinate Ya, is picked up by the catcher 81 of the robot 80 based on the XY coordinates after the elapse of a predetermined time, and is discarded into the fruit disposal box 92L or 92R based on the coordinate Ya.

In addition, the rotten fruit A11 is managed by the robot controller 70 based on the identification symbol A11, the timing tb, and the coordinate Yb, is picked up by the catcher 81 of the robot 80 based on the XY coordinates after the elapse of a predetermined time, and is discarded into the fruit disposal box 91L or 91R based on the coordinate Yb.

What is claimed is:

1. A fruit sorting apparatus comprising:
   a conveyor configured to convey a plurality of charged fruits from a detection area located on an upstream side to a sorting area located on a downstream side;
   a CCD camera configured to photograph the fruits in the detection area of the conveyor;
   a computer configured to detect a rotten fruit and a nonstandard fruit having an irregular shape or size based on images of the fruits photographed by the CCD camera;
   a robot controller configured to control a robot, and
   wherein the robot is configured to pick up the rotten fruit and the nonstandard fruit detected by the computer in the sorting area, and
   wherein the computer assigns an identification symbol to each of the fruits conveyed in the detection area and tracks movement of the each of the fruits, and, when the rotten fruit or the nonstandard fruit is conveyed from the detection area to the sorting area, sends out the identification symbol of the rotten fruit or the nonstandard fruit, data of timing of charging into the sorting area, and data of a position in a horizontal direction perpendicular to a conveyance direction of the conveyer to the robot controller.

2. The fruit and vegetable sorting apparatus according to claim 1, wherein the conveyor conveys the fruits while rotating the fruits in the detection area and conveys the fruits in a stopped state in the sorting area.

3. The fruit sorting apparatus according to claim 2, wherein the computer acquires a plurality of images of a plurality of faces of each fruit photographed by the CCD camera in the detection area and detects the rotten fruit based on the plurality of the images.

4. The fruit sorting apparatus according to claim 2, wherein the computer acquires images of a plurality of faces photographed by the CCD camera in the detection area for each of the fruits and detects the nonstandard fruit based on the plurality of the images.

5. The fruit sorting apparatus according to claim 1, wherein the robot controller issues a pickup instruction for picking up the rotten fruit or the nonstandard fruit to the robot based on the identification symbol, the data of the timing, and the data of the position sent out from the computer.

6. The fruit and vegetable sorting apparatus according to claim 5, further comprising:
   a fruits disposal box for rotten fruits, into which the rotten fruit picked up by the robot is discarded; and
   a fruit disposal box for nonstandard fruits, into which the nonstandard fruit picked up by the robot is discarded.

7. The fruit sorting apparatus according to claim 6,
   wherein each of the fruits disposal box for rotten fruits and the fruits disposal box for nonstandard fruits is arranged on a right outer side and a left outer side of the sorting area of the conveyor in the conveyance direction, and
   the robot controller controls the robot such that the rotten fruit is discarded into the fruits disposal box for rotten fruits arranged on the right outer side or the left outer side in accordance with the data of the position of the rotten fruit when the robot picks up the rotten fruit, and the nonstandard fruit is discarded into the fruits disposal box for nonstandard fruits arranged on the right outer side or the left outer side in accordance with the data of the position of the nonstandard fruit when the robot picks up the nonstandard fruit.

8. A fruits sorting method comprising:
   imaging a plurality of charged fruits in a detection area located in the middle of conveyance executed by a conveyor by using CCD camera;
   detecting a rotten fruit and a nonstandard fruit having an irregular shape or size based on images acquired by the CCD camera;
   picking up the rotten fruit and the nonstandard fruit detected in a sorting area located on a downstream side of the detection area by using a robot; and
   assigning an identification symbol to each of the fruits conveyed in the detection area, tracking movement of the each of the fruits, and, when the rotten fruit or the nonstandard fruit is conveyed from the detection area to the sorting area, acquiring the identification symbol of the rotten fruit or the nonstandard fruit, data of timing of charging into the sorting area, and data of a position in a horizontal direction perpendicular to a conveyance direction of the conveyor.

9. The fruits sorting method according to claim 8, wherein the fruits are conveyed while being rotated in the detection area, and the fruits are conveyed in a stopped state in the sorting area.

10. The fruits sorting method according to claim 8, wherein the rotten fruit or the nonstandard fruit is picked up in the sorting area by the robot based on the identification symbol, the data of the timing, and the data of the position that are acquired.

11. The fruits sorting method according to claim 10, further comprising discarding the rotten fruits picked up by the robot into a fruits disposal box for rotten fruits and discarding the nonstandard fruit picked up by the robot into a fruit disposal box for nonstandard fruits.

12. The fruits sorting method according to claim 10,
wherein the rotten fruit picked up by the robot is discarded into the fruit disposal box for rotten fruits arranged on the right outer side or the left outer side in accordance with the data of the position, and the nonstandard fruit picked up by the robot is discarded into the fruit disposal box for nonstandard fruits arranged on the right outer side or the left outer side in accordance with the data of the position.

\* \* \* \* \*